Oct. 12, 1937.  A. O. WILLIAMS  2,095,427
BRAKE SHOE
Filed May 14, 1934
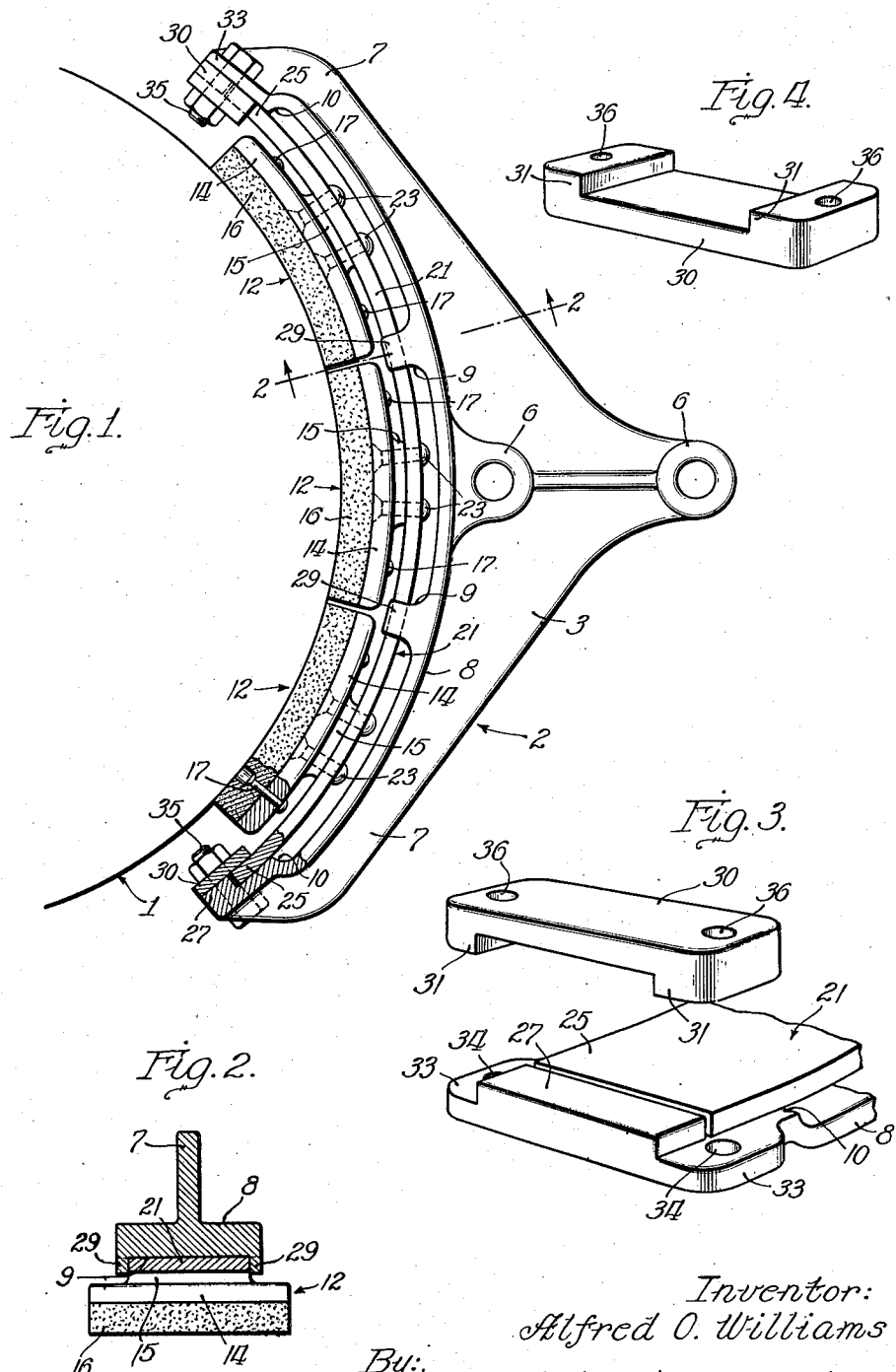
Inventor:
Alfred O. Williams
By: Brown, Jackson, Boettcher & Dienner
Attys.

Patented Oct. 12, 1937

2,095,427

UNITED STATES PATENT OFFICE 2,095,427

BRAKE SHOE

Alfred O. Williams, Battle Creek, Mich., assignor, by mesne assignments, to Clark Equipment Company, Buchanan, Mich., a corporation of Michigan Application May 14, 1934, Serial No. 725,453

19 Claims. (Cl. 188—240)

The present invention relates generally to brake gear for railroad vehicles and the like, and is particularly concerned with the provision of a new and improved brake shoe of the clasp type especially designed for high speed traffic and so constructed and arranged as to minimize the effects of temperature changes in the brake shoe segment or segments proper.

One of the principal objections to the railway brake shoes in use today is that when extreme pressures are applied to the shoe, as is necessary for high speed braking, the heat generated causes the shoe to expand, and since the shoe proper is an arcuate piece and since it tends to straighten out when heated, under high speed braking conditions the brake shoe opens up at each end so that full contact with the rim of the wheel is not obtained. When the ends of the brake shoe move away from the wheel, the area of the brake shoe in actual contact with the wheel then becomes less, and this increases the pressure per unit area of the portion of the brake shoe which is still in contact with the wheel, which further aggravates the condition. If increased pressures are applied to the brake shoe it is possible that the shoe will expand so much that the actual area in contact with the wheel will be so lessened that, if the brakes are continuously applied, abrasion will take place, with consequent destruction of the brake shoe and injury to the wheel.

However, for high speed braking, relatively high braking pressures are necessarily required in order to develop sufficient friction to bring the train to a stop or retard its speed, and therefore it is desirable not only to increase the braking pressures capable of being used but to also obtain a greater contact around the circumference of the wheel or the brake drum than is usually employed. The use of conventional brake shoes for this type of service is not, however, satisfactory, for even if the brake shoe is made longer so as to obtain a greater contact, the heat generated when the brakes are applied causes the ends of the brake shoe to expand away from the wheel, and the longer the brake shoe the greater will the extent of movement of the ends be. Therefore, nothing can be gained in attempting to increase the contact area by lengthening the shoe.

With the above and other factors in mind, the present invention contemplates the provision of a brake shoe having individual and separately supported segments flexibly connected with the yoke or brake head so that, while an adequate area of contact with the wheel is obtained, the several brake shoe segments are maintained in full contact with the wheel or the brake drum notwithstanding the appreciable rise of temperature of the brake shoe segments. More specifically, it is the object of the present invention to employ a brake shoe having a plurality of segments, each of which is in full contact with the wheel or brake drum and each of which is short enough so that the heat generated when the brakes are applied is not sufficient to appreciably lessen the contact area of the brake shoe segments.

Another object of the present invention is the provision of a brake shoe made of several separate segments, each resiliently supported so that, regardless of shoe distortion, the pressures will be maintained over the full area of contact between the brake shoe and the wheel or brake drum.

These and other objects of the present invention will be apparent from the following description of the preferred embodiment, taken in conjunction with the accompanying drawing illustrating such embodiment.

In the drawing:

Figure 1 is a side elevation of the brake shoe, embodying a plurality of shoe segments resiliently connected with the brake holder or head;

Figure 2 is a section taken along the line 2—2 of Figure 1;

Figure 3 is a fragmentary perspective showing the manner in which the ends of the resilient shoe segment support are connected with the brake holder or yoke; and Figure 4 is a perspective of one of the clips or pieces by which the ends of the segment support are held in place.

Referring now to the drawing, the reference numeral 1 indicates the wheel or brake drum which the brake shoe indicated in its entirety by the reference numeral 2 is adapted to brake. The brake shoe in its entirety comprises a yoke 3 which forms the brake holder or brake head and, as best shown in Figure 1, is of generally arcuate formation and extends for a considerable distance around the wheel or brake drum 1. Spaced apertured bosses 6 provide for the connection with the associated brake beam and levers, and the brake holder or brake head 3 is of generally T cross section, as best shown in Figure 2, embodying a web 7 and an arcuate section 8 having central bosses 9 and end bosses 10 spaced radially inwardly from the surface of the arcuate flanged section 8.

The braking elements are in the form of a plurality of brake shoe segments 12, each section consisting of a backing section 14, each having a central attaching boss 15 in its central section and friction facing material 16 secured to the backing sections 14 by any suitable means such as rivets 17, as indicated in Figure 1.

The separate brake shoe segments 12 are supported in end to end relationship adjacent the arcuate flanged section 8 of the yoke or holder 3 by being secured to a flexible strap member 21 which is preferably formed of spring steel or the equivalent. The strap 21 is, like the flanged section 8, arcuate about the axis of rotation of the wheel or brake drum 1 and is of such length that the ends thereof bear against the end bosses 10 on the brake holder 3, and the intermediate portions of the strap 21 likewise bear against the intermediate bosses 9 of the brake holder 3. The brake shoe backing sections 14 are rigidly connected with the supporting strap 21, preferably by a plurality of rivets 23 inserted through suitable openings formed in the attaching bosses 15 and in the resilient supporting strap 21. It will be noted that the adjacent ends of the brake shoe segments 12 are spaced apart a short distance to provide for a limited amount of angular movement of the brake shoe segments independent of one another, such angular movement being provided for by the attachment of the segments to the supporting strap 21 only at the intermediate sections of the segments and being limited by the resiliency of the supporting strap. It will also be noted that the points of attachment of the brake shoe segments are substantially midway, respectively, of the bosses 9 and 10.

As best shown in Figure 3, the ends 25 of the flexible supporting strap 21 are disposed against the end bosses 10 on the brake holder or brake head 3, and the strap 21 is prevented from moving endwise with respect to the brake holder 3 by a projection or lug 27 formed at each end of the brake holder 3 and extending radially inwardly from the end boss 10 at each end. There is a small clearance between each end of the strap 21 and the associated end lug 27 to provide for expansion and contraction of the supporting strap 21. The intermediate bosses 9 are provided with pairs of projections or lugs 29 which, as best shown in Figure 2, embrace the sides of the supporting strap 21 and serve to prevent the lateral displacement of the intermediate portions of the supporting strap. The ends of the supporting strap 21 are held in position by a cap piece or clip 30, the latter including raised sections 31 adapted to fit against the ends of the projection 27 and the sides or edges of the associated end of the supporting strap 21. The end section of the brake holder or yoke 3 is extended laterally at each side, as indicated by the reference numerals 33 in Figure 3, and these lateral extensions are apertured, as at 34, to receive attaching bolts 35 by which the cap 30 is fastened to the yoke 3, the cap 30 having apertures 36 to receive the attaching bolts 35. As will be apparent from Figure 3, when the cap piece 30 is bolted in place, the associated end of the supporting strap 21 is held in place, both against endwise and lateral displacement, but with sufficient looseness to allow the strap 21 to adjust itself while applying the braking pressures desired.

When the brakes are applied, the pressure to which the brake head or brake holder 3 is subjected is transmitted at substantially uniformly spaced points, determined by the intermediate and end bosses 9 and 10, to the brake shoe segment supporting strap 21, and this member transmits the pressure to the several brake shoe sections 12 at spaced points, determined by the attaching bosses 15 and the rivets 23. Even though relatively great pressures are exerted against the wheel or brake drum 1 and even though the temperature of the brake shoe segments 12 is materially increased, the segments maintain full contact with the brake drum wheel, principally because the segments 12 are short enough so that the distortion due to the heat generated will not be sufficient to open the segments at the ends thereof and also due to the fact that the brake shoe segments 12 can adjust themselves relative to each other by virtue of their spring support 21.

While I have shown and described above the preferred embodiment, it will be apparent that my invention is not to be limited to the specific details shown and described but that, in fact, widely different means may be employed in the practice of the broader aspects of my invention. For example, while I have illustrated my invention in a brake shoe structure in which friction material is used for facing each shoe or segment, these parts could just as well be made of cast iron or any other suitable material.

What I claim, therefore, and desire to secure by Letters Patent is:

1. A brake shoe of the clasp type comprising a rigid supporting head, a member secured at its ends to said head, and a plurality of individual brake shoe segments separately connected with said member.

2. A brake shoe of the clasp type comprising a rigid supporting head, a member carried by said head and connected therewith at its ends and at one or more intermediate points, a plurality of individual brake shoe segments spaced apart in arcuate end to end relation, and means separately connecting said individual brake segments with said member at points between said end and intermediate points.

3. A brake shoe comprising a supporting head, a flexible strap connected with said head at spaced points, and a plurality of brake shoe segments carried by said flexible strap and connected therewith at points intermediate said first mentioned points.

4. A brake shoe comprising a supporting head, a flexible strap connected at its ends with said head, a plurality of brake shoe segments, and means connecting the central portions of each of said brake shoe segments to said flexible strap at uniformly spaced points between the ends thereof.

5. A brake shoe of the clasp type comprising a rigid supporting head, a plurality of individual brake shoe segments, and spring means independently supporting each of said segments in spaced relation with respect to said supporting head.

6. A brake shoe of the clasp type comprising a rigid supporting head, a plurality of individual brake shoe segments, and means serving as a leaf spring for anchoring each of said segments to said head for limited angular movement with respect thereto in the plane of the head.

7. A brake shoe comprising a supporting yoke of generally arcuate formation with a boss at each end thereof, a plurality of individual brake shoe segments having a braking surface and a central attaching boss at the back of each segment, and a flexible supporting strap connected to said segment bosses and to the bosses at the ends of said yoke.

8. A brake shoe comprising a supporting head of generally arcuate formation and having bosses at the ends thereof and intermediate said ends, a plurality of brake shoe segments spaced apart in end to end relation adjacent the arcuate portion of said head, a segment supporting strap carried by said head and bearing against said bosses, and means securing said segments to said strap at points intermediate said bosses.

9. A brake shoe comprising a supporting head of generally arcuate formation and having bosses at the ends thereof and intermediate said ends, a plurality of brake shoe segments spaced apart in end to end relation adjacent the arcuate portion of said head, a segment supporting strap carried by said head and bearing against said bosses, means securing said segments to said strap at points intermediate said bosses, and means carried by said head adjacent said bosses for preventing lateral displacement of said strap with respect to the head.

10. A brake shoe comprising a supporting yoke of generally arcuate formation and having substantially uniformly spaced bosses at the ends thereof and at intermediate portions of the yoke, a resilient supporting strap bearing against said bosses, a cap piece carried at each end of said yoke and embracing the corresponding end of said strap, and a plurality of brake shoe segments individually supported by said strap at points intermediate said bosses.

11. A brake shoe comprising a supporting yoke of generally arcuate formation and having substantially uniformly spaced bosses at the ends thereof and at intermediate portions of the yoke, a resilient supporting strap bearing against said bosses, a cap piece carried at each end of said yoke and embracing the corresponding end of said strap and serving to prevent lateral displacement of the latter relative to said yoke, projections extending from the intermediate bosses and engaging opposite sides of said strap to also prevent lateral displacement of the latter, and a plurality of brake shoe segments individually supported by said strap at points between said bosses.

12. A brake shoe comprising a supporting yoke of generally arcuate formation and having substantially uniformly spaced bosses at the ends thereof and at intermediate portions of the yoke, a resilient supporting strap bearing against said bosses, a cap piece carried at each end of said yoke and embracing the corresponding end of said strap to present lateral displacement of the latter, a lug at each end of the yoke and adapted to engage the corresponding end of said strap to prevent endwise displacement thereof relative to the yoke, lugs carried by the intermediate bosses and engageable with the sides of said strap to prevent lateral displacement of the intermediate portions of the latter, and a plurality of brake shoe segments spaced apart in end to end relation and each having a back plate section with a central boss secured to said strap intermediate the bosses on the yoke against which the strap bears.

13. A brake shoe comprising a supporting head, means serving as a flexible member connected at its ends with said head, a plurality of brake shoe segments, and means connecting each of said brake shoe segments to said flexible member at spaced points between the ends thereof.

14. A brake shoe of the clasp type comprising a rigid supporting head, a plurality of individual brake shoe segments, a spring member connected at its ends with said rigid supporting head, and means connecting each of said segments with said spring member intermediate the ends of the latter.

15. A brake shoe structure comprising a supporting head, a spring member connected at its ends to said supporting head and having intermediate portions movable relative to the latter, and a brake shoe segment connected with said spring member intermediate its ends so as to be connected thereby with the supporting head for movement relatively thereto.

16. A brake shoe structure comprising an arcuate supporting head having spaced ends formed with spring receiving means, a spring member having its ends connected to the ends of said arcuate supporting head, intermediate portions of said spring member being free for movement relative to said supporting head, a brake shoe segment, and means connecting said shoe segment with the intermediate portion of said spring member.

17. A brake shoe structure comprising an arcuate supporting head having spring receiving means at its ends, an arcuate spring member having its ends received by said means and reacting against the ends of said supporting head, a plurality of separate brake shoe elements, and means connecting said shoe elements with portions of said spring member intermediate the ends of said arcuate supporting head, thereby carrying said brake shoe elements for movement relative to each other and to said supporting head.

18. In combination, an arcuately shaped supporting head, an arcuate resilient strap secured at its ends to said head radially inwardly relative to the arc of curvature of the latter, and brake shoe means secured to said strap intermediate its ends and radially inwardly relative to the arc of curvature of the strap.

19. In combination, an arcuately shaped supporting head, a resilient strap secured at its ends to said head, brake shoe means secured to said strap intermediate its ends, and means on said head limiting intermediate lateral movement of said strap.

ALFRED O. WILLIAMS.